United States Patent
Gotwals et al.

(10) Patent No.: US 7,043,719 B2
(45) Date of Patent: May 9, 2006

(54) METHOD AND SYSTEM FOR AUTOMATICALLY PRIORITIZING AND ANALYZING PERFORMANCE DATA FOR ONE OR MORE, SYSTEM CONFIGURATIONS

(75) Inventors: Jacob K. Gotwals, Cupertino, CA (US); James C. Abel, Phoenix, AZ (US); Nathanael K. Brown, Albuquerque, NM (US); Brad D. Hinkle, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1010 days.

(21) Appl. No.: 09/912,173

(22) Filed: Jul. 23, 2001

(65) Prior Publication Data

US 2003/0018641 A1  Jan. 23, 2003

(51) Int. Cl.
  *G06F 9/44* (2006.01)
(52) U.S. Cl. .................. 717/131; 717/124; 717/125; 717/126; 717/127; 717/128; 717/129; 717/130
(58) Field of Classification Search .................. 714/39
  See application file for complete search history.

(56) References Cited

U.S. PATENT DOCUMENTS 6,467,052 B1 * 10/2002 Kaler et al. .................. 714/39
6,691,254 B1 * 2/2004 Kaler et al. .................. 714/39

OTHER PUBLICATIONS

Kohn, et al., "ATExpert*", Journal of Parallel and Distributed Computing 18, pp. 205-222 (1993), by Academic Press, Inc.
Cockcroft, "System Performance Monitoring", Sep. 1995, pp. 1-12, http://www.sun.com/950901/columns/adrian/column1.html.
Bobrowski, "Performance Tuning with Oracle Expert", Mar./Apr. 1997, pp. 1-5, http://www.oracle.com/oramag/oracle/97-Mar/27CS.html.
U.S. Appl. No. 09/669,604, filed Sep. 26, 2000.
U.S. Appl. No. 09/911,554, filed Jan. 23, 2003.

* cited by examiner

*Primary Examiner*—Kakali Chaki
*Assistant Examiner*—Mark P. Francis
(74) *Attorney, Agent, or Firm*—Blakely, Sokoloff, Taylor & Zafman LLP

(57) ABSTRACT

A system and a method of automatically prioritizing and analyzing performance data for one or more system configurations are provided. Performance data is obtained about a system using a first tool. The performance data is sorted by a number of contexts, each context divided into a number of sub-contexts. The performance data for at least one sub-context is automatically prioritized using a pre-determined criteria. An insight is obtained using a second tool for at least one sub-context based on the prioritized performance data. An advice associated with that insight is obtained using the second tool.

47 Claims, 4 Drawing Sheets

METHOD AND SYSTEM FOR AUTOMATICALLY PRIORITIZING AND ANALYZING PERFORMANCE DATA FOR ONE OR MORE, SYSTEM CONFIGURATIONS

NOTICE OF RELATED APPLICATIONS

This application is related to U.S. Patent Application entitled "A System and a Method of Sorting Performance Data for One or More System Configurations" filed on Jul. 23, 2001, and U.S. patent application entitled "Method and System for Automatically Interpreting Computer System Performance Measurements" filed on Sep. 26, 2000, both commonly assigned herewith.

FIELD OF THE INVENTION

The invention relates generally to analyzing computer system performance, and more particularly, to automatically prioritizing and analyzing performance data for one or more system configurations

BACKGROUND

Modern computer operating system have become quite capable and equally complex, with a great deal of interdependency between the various resources that are managed by the operating system. Such resource management can include task priority, the allocation of memory, distribution of programs and data between disk/main memory/cache, spooling, and many others. As a result, much effort has been put into getting the maximum performance out of a system by monitoring the system and adjusting various parameters to improve the performance parameters that are considered more important in that particular system In a related activity, application developers conduct similar optimization efforts to maximize performance in their application programs. These optimization efforts are generically known as system tuning.

Various types of analysis systems are used to implement system tuning. For example, software writers can collect data on an execution profile (describes where a software application spent time when it was run) by inserting programming code around detailed functions. This would enable the programmer to get a rough idea of time spent at a function level. However, this method would be very tedious for long, complicated long programs.

Another possibility may be using a tool instrument that compiles code. For example, many compilers have an option that the compiler may insert a timing routine before every program in the function to collect timing information on the program. However, this causes the program to run very slowly.

Another example includes commercial application such as Intel Corporation's VTUNE™. VTUNE™ is a complete visual tuning environment for Windows developers. VTUNE™ reports on central processing unit (CPU) statistics, including CPU time consumed for an application and for operating system components. In addition, greater levels of detail may also be seen. For example, VTUNE™ is capable of listing the application's functions and specific timing information related to each However, VTUNE™ does not allow for comparing and fixing programs run on two different systems.

As discussed above, the methods mentioned above do not currently allow for automatically prioritizing and analyzing performance data for one or more programs running on multiple systems. Prioritizing and analyzing performance data obtained by running the same software program on multiple systems is important to software developers, since this allows them to assess how changes in the system configuration will impact the software program's performance, and to assess how to modify the software program to improve its performance on multiple system configurations.

BRIEF DESCRIPTION OF THE DRAWINGS

The present invention is illustrated by way of example, and not limitation, in the figures of the accompanying drawings in which.

DETAILED DESCRIPTION

A system and a method of automatically prioritizing and analyzing performance data for one or more system configurations are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. Several embodiments are described herein. However, there are other ways that would be apparent to one skilled in the art that may be practiced without specific details.

Figure 1:
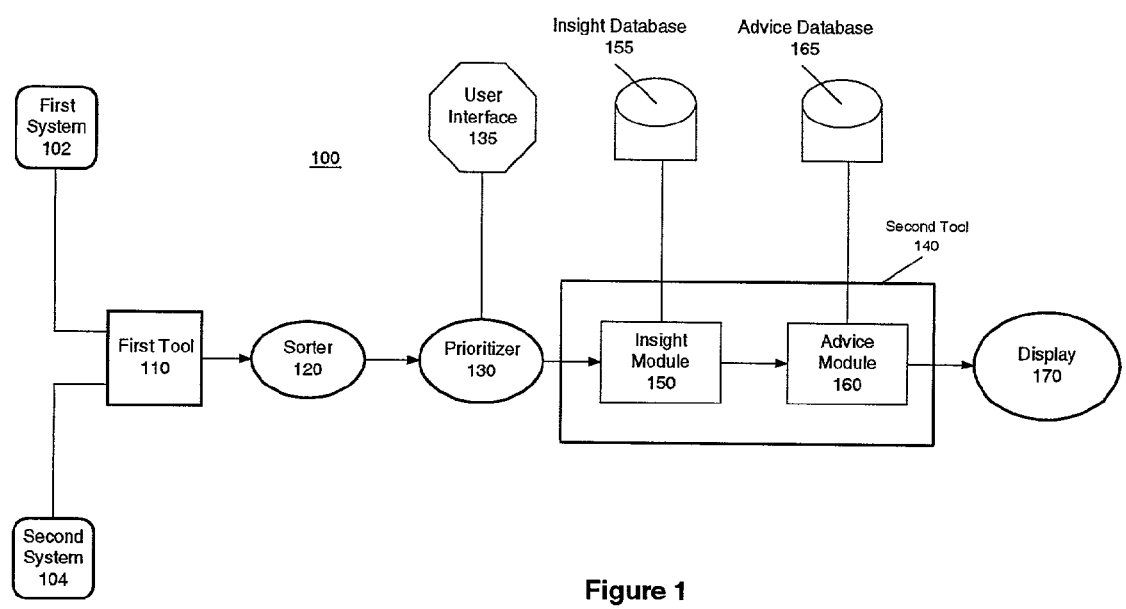
FIG. 1 illustrates a block diagram of a system to automatically prioritize and analyze performance data from one or more system configurations.

FIG. 1 illustrates a block diagram of a system 100 to automatically prioritize and analyze performance data from one or more system configurations. The system includes a first tool 110 that obtains performance data for one or more programs running on a first system 102 and a second system 104.

In one embodiment, the first tool 110 includes software code inserted by a software developer around detailed functions so that timing information may be obtained for each of those functions.

In an alternative embodiment, the first tool 110 includes a compiler that will automatically insert a timing routine before every function in a program. This type of tool collects timing information for the function as the program runs.

In an alternative embodiment, the first tool is 110 Intel Corporation's VTUNE™. VTUNE™ is a visual tuning environment for Windows developers. It utilizes a combination of binary instrumentation and time sampling to monitor the performance of many aspects of applications and the Windows operating environment, including device drivers and system dynamic link libraries (DLLs). VTUNE™ provides detailed central processing unit (CPU) statistics including CPU time consumed for an application and for operating system components. In addition, individual components may be selected to obtain further detail on. VTUNE™ also provides specific timing information related to an application's functions, timing information for each line of source code, and corresponding assembly language statements. In alternative embodiments, the first tool 210 may be other programs or methods that may be used to obtain performance data.

Referring back to FIG. 1, in one embodiment, the performance data is obtained from the first tool 110 and sent to a sorter 120. This may include performance data for a number of programs run on a system during a sampling period based on one or more performance counters. The performance data is a collection of information that describes where a software application spent time when it was run. Software developers or software tools may utilize this type of data to determine which parts of the software code in a program may be optimized or improved. In one embodiment, the profile may contain data measurements based on a performance counter such as clockticks. In alternative embodiments, the performance counter may be retired instructions or cache misses. Alternative embodiments may include one or more other performance counters.

Once the first tool 110 obtains the performance data, the sorter 120 sorts the performance data by a number of contexts. Each context is divided into a number of sub-contexts. In one embodiment, the context is a single program running on one system, and the sub-contexts may be processes or modules. Accordingly, the performance data for the first system 102 is sorted by process and module. A programmer is able to then quickly find processes and modules of a program that perform poorly on the first system 102. In an alternative embodiment, the context is a single program running on one system, and the sub-contexts may be bins of programming instructions. Accordingly, the performance data is sorted according to a number of bins of programming instructions. In one embodiment, a single bin may contain 128 instructions of the program In alternative embodiments, bin sizes may vary.

Once the sorter 120 has sorted the performance data, the prioritizer 130 automatically prioritizes the performance data for the sub-contexts using a predetermined criteria. In one embodiment, the function may be supplied by a user through a user interface 135. In an alternative embodiment, certain functions may automatically be used without user input.

In one embodiment, the pre-determined criteria may be the longest running time. For example, the first tool 110 may have collected performance data including the running time for a number of programs that run on the first system 102. After this performance data has been obtained from the first tool 110 and sorted by the sorter 120, the prioritizer 130 prioritizes the performance data for the programs in order according to the longest running time. A program with a running time of 3 seconds, for example, will accordingly be listed with its running time before a program having a running time of 2 seconds. Accordingly, in this example, programmers may easily identify which program spent the most time on a given system. In alternative embodiments, the pre-determined criteria may be the greatest number of clockticks, the greatest number of retired instructions, or other criteria.

In one embodiment, the pre-determined criteria may be an equation such as:

$R_1-R_2$, where $R_1$ is the running time of a context or a sub-context on the first system 102, and $R_2$ is the running time of the context or the sub-context on the second system 104.

This type of prioritized data allows a programmer to compare the efficiency of different systems by running the same program on both systems and comparing run times of the program on both systems. Prioritizing and analyzing performance data obtained by running the same software program on multiple systems is important to software developers, since this allows them to assess how changes in the system configuration will impact the software program's performance and to assess how to modify the software program to improve its performance on multiple system configurations.

For example, the running time of a program that was run on the first system 102 may be compared with the running time of the same program run on the second system 104. Accordingly, this type of pre-determined criteria will show that the program ran one second faster on one system in comparison to another. In alternative embodiments, the pre-determined criteria may also be used to prioritize the performance data according to sub-contexts such as processes, modules, or bins of programs run on different systems.

In an alternative embodiment, the pre-determined criteria is the following equation:

$CT_1-CT_2$ where, $CT_1$ is the clockticks of a context or a sub-context on the first system 102, $CT_2$ is the clockticks of the context or sub-context on the second system 104.

In another alternative embodiment, the pre-determined criteria may be the following equation:

$0.8 \times CT_1-CT_2$.

In other alternative embodiments, the pre-determined criteria may be other equations.

Referring back to FIG. 1, once the performance data has been prioritized by the prioritizer 130 according to a pre-determined criteria, a second tool 140 is used to obtain an insight for at least one sub-context. An insight module 150 within the second tool 140 determines an insight for the sub-context based on the prioritized performance data. In one embodiment, an insight may be a qualitative description of a monitored measurable activity in a computer system. For example, the number of cache misses may be monitored by the first tool 110. After this performance data is sorted and prioritized, an insight such as "high cache misses" may be given for this data. In one embodiment, the insight module 150 may use data from an insight database 155 to determine the insight.

Then, an advice module 160 determines the advice associated with that insight. In one embodiment, an advice may be a description of what should be done in response to the insight. In one embodiment, the advice module 160 may use an advice database 165 to determine the advice for that insight. In one embodiment, the second tool 140 may be software that provides insights and advice.

Referring back to FIG. 1, once an insight and an advice for that insight has been obtained from the second tool 140, certain information may be displayed on a display 170. In one embodiment, the insight and advice may be displayed along with the performance data for each program. In alternative embodiments, other information may be displayed.

Figure 2:
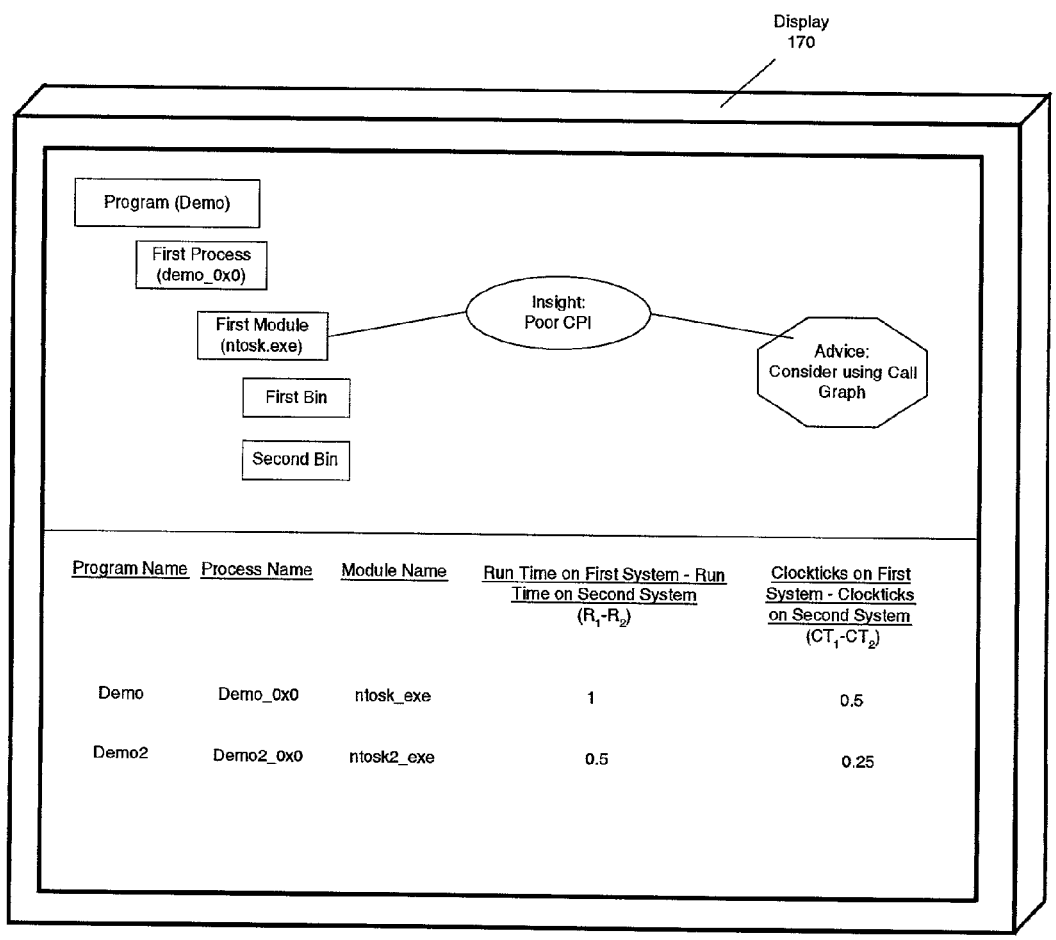
FIG. 2 illustrates a diagram of one embodiment of a display.

FIG. 2 illustrates a diagram of one embodiment of a display 170. A program named "Demo" is shown on the display 170. Demo is divided into a first process called "demo_0x0", and the first process is divided into a first module called "ntosk.exe". The first module is then divided into a first bin and a second bin, each bin containing a number of computer instructions. An insight has been obtained for the first module, and is shown on the display 170 as "frequent L1 data cache misses." This insight suggests that the working data set fits in the L2 cache but not the L1 cache. L2 cache misses have a much greater impact on performance than L1 cache misses, and L2 cache problems are often easier to solve than L1 cache problems. The indicators that may be used to obtain this insight are that L1 D-cache misses per instructions retired is poor and L2 misses per data memory reference is good.

An advice has been obtained for that insight, and is shown on the display 170 as "If possible, reduce the working data set so that it fits in the L1 cache." The advice may also suggest that the user revise the algorithm to reduce the working data so that it fits in the L1 cache, if possible. An advice may also refer the user to a description of "Loop Blocking" in the Intel Architecture Optimization Reference Manual. Loop Blocking transforms the memory domain of a given problem into smaller units, rather than sequentially traversing the entire memory domain. Each unit is small enough to fit all the data for a given computation into the cache, thereby maximizing data reuse.

Other advice given for the insight shown on the display 170 includes the following: "Consider using prefetch instructions." Prefetch instructions may be used to fetch data into cache before it is needed if it is not possible to reduce the working data set. The advice may also refer the user to a description of prefetch instructions in a specified chapter of the Intel Architecture Reference Manual. In alternative embodiments, different advice may be given for various insights.

In one embodiment, the display 170 in FIG. 2 also shows the sorted and prioritized performance data for two programs named "Demo" and "Demo2". The program, Demo, includes process "Demo-0x0" and module "ntosk.exe". The run time for ntosk.exe on the first system minus the run time for ntosk.exe on the second system is shown to be one second. In contrast, the run time for ntosk2.exe of Demo2 on the first system minus the run time for ntosk2.exe on the second system is shown to be 0.5 seconds. Since the data is prioritized on the display 170 so that the longest run time is listed first, ntosk.exe is listed before ntosk2.exe. Other performance data that is listed on the display 170 includes the clockticks for a context or sub-context run on the first system minus the clockticks for the context or sub-context run on the second system In alternative embodiments, other performance data may be displayed.

Figure 3:
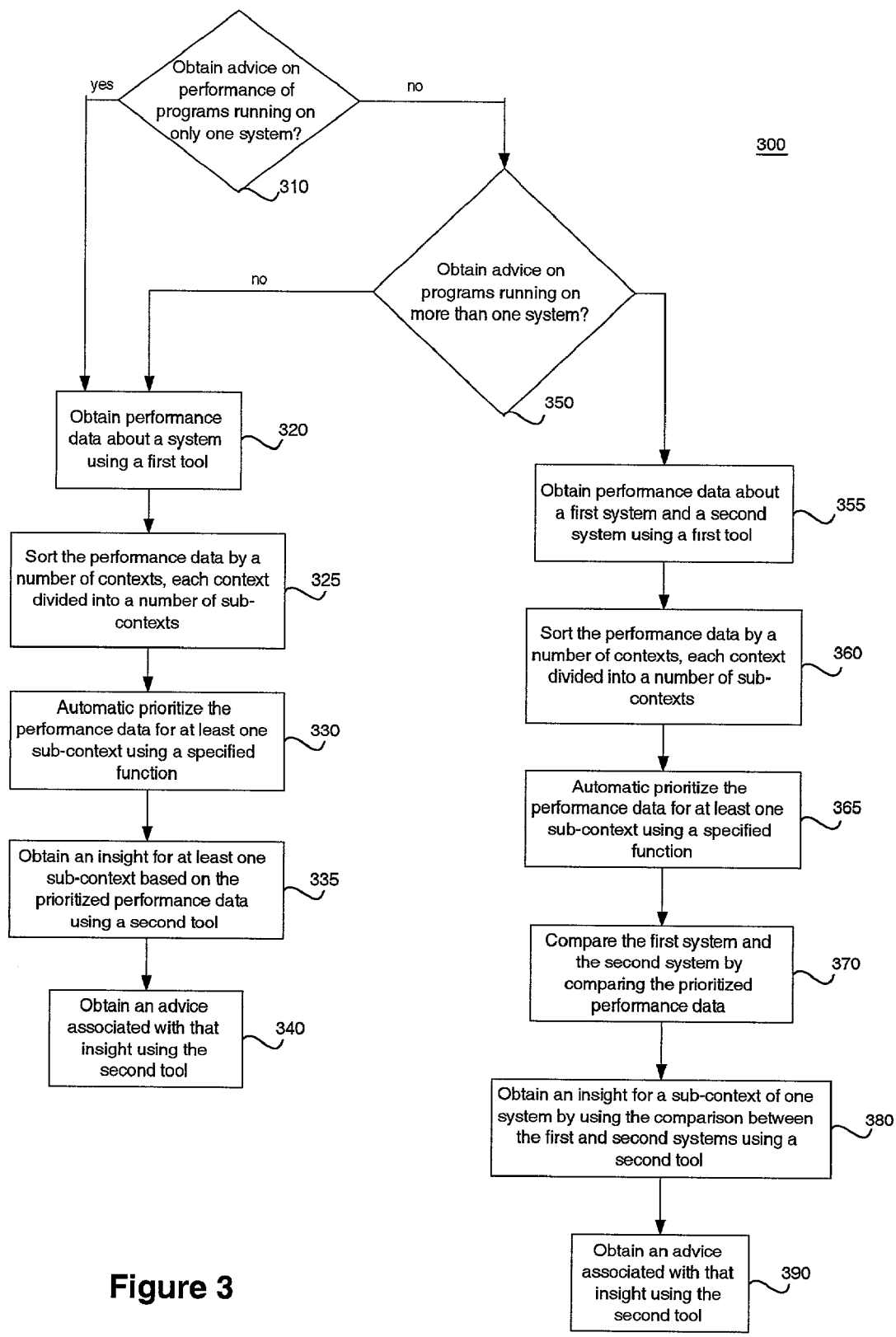
FIG. 3 illustrates a flow diagram of one embodiment of a process of automatically prioritizing and analyzing performance data from one or more system configurations.

FIG. 3 illustrates a flow diagram of one embodiment of a process 300 of automatically prioritizing and analyzing performance data from one or more system configurations. At processing block 310 it is determine if advice is to be obtained on the performance of programs running on only one system.

If advice is to be obtained for one or more programs running on only one system, then the process moves to processing block 320. At processing block 320, performance data about a system is obtained using a first tool. At processing block 325, the performance data is sorted by a number of contexts. Each context is divided into a number of sub-contexts. At processing block 330, the performance data is automatic prioritized for at least one sub-context using a pre-determined criteria. At processing block 335, an insight is obtained from a second tool for at least one sub-context based on the prioritized performance data. At processing block 340, an advice associated with that insight is obtained from the second tool.

If advice is not to be obtained for programs running on only one system, the process moves from processing block 310 to processing block 350. At processing block 350, it is determined if advice is to be obtained from one or more programs running on more than one system. If advice is not to be obtained for one or more programs running on more than one system, the process moves to processing block 320. If advice is to be obtained for one or more programs running on more than one system, the process moves to processing block 355. At processing block 355, performance data is obtained about a first system and a second system using a first tool. At processing block 360, the performance data is sorted by a number of contexts. Each context is divided into a number of sub-contexts. At processing block 365, the performance data is automatic prioritized for at least one sub-context using a pre-determined criteria. At processing block 370, the first system and the second system are compared by comparing the prioritized performance data. At processing block 380, an insight is obtained for at least one sub-context of one system by using the comparison between the first and second systems using a second tool. At processing block 390, an advice associated with insight is obtained using the second tool.

Figure 4:
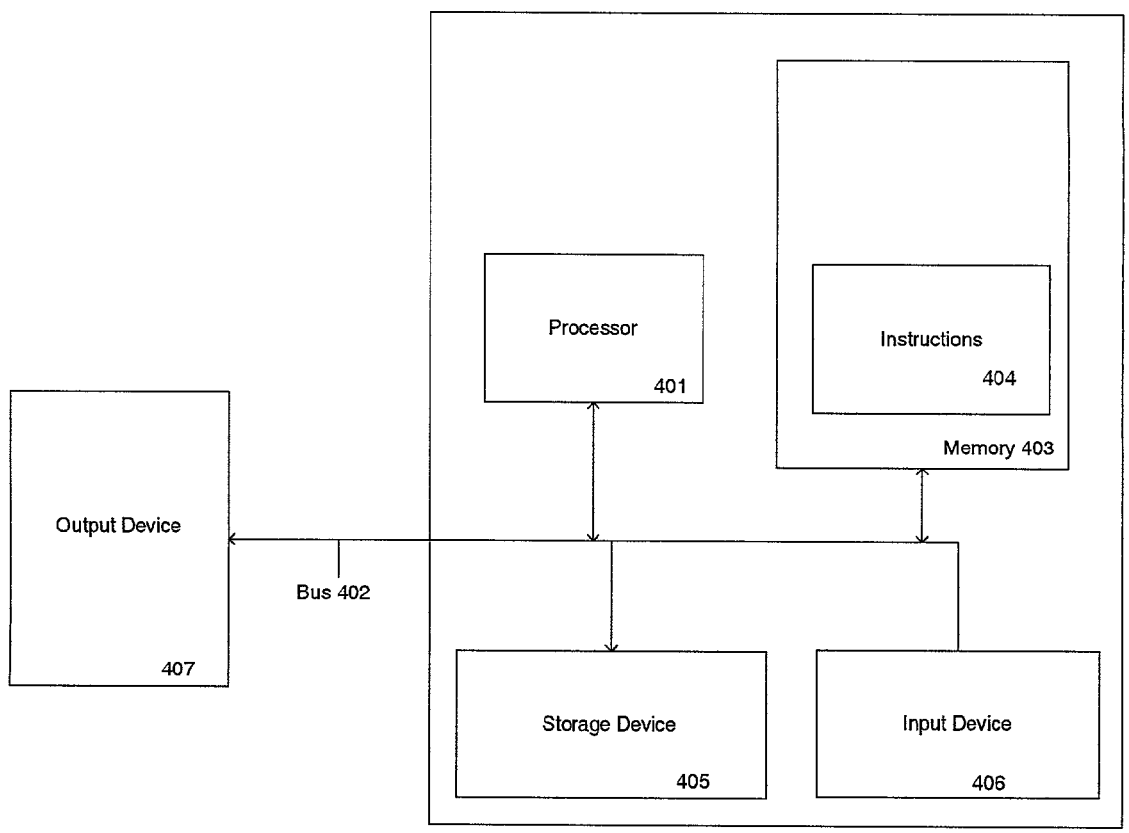
FIG. 4 illustrates an example of one embodiment of a computer system

The system and method disclosed herein may be integrated into advanced Internet- or network-based knowledge systems as related to information retrieval, information extraction, and question and answer systems. FIG. 4 illustrates an example of one embodiment of a computer system The system shown has a processor 401 coupled to a bus 402. Also shown coupled to the bus 402 is a memory 403 which may contain instructions 404. Additional components shown coupled to the bus 402 are a storage device 405 (such as a hard drive, floppy drive, CD-ROM, DVD-ROM, etc.), an input device 406 (such as a keyboard, mouse, light pen, bar code reader, scanner, microphone, joystick, etc.), and an output device 407 (such as a printer, monitor, speakers, etc.). Of course, alternative computer system could have more components than these or a subset of the components listed.

The method described above can be stored in the memory of a computer system (e.g., set top box, video recorders, etc.) as a set of instructions to be executed, as shown by way of example in FIG. 4. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.).

A system and a method of automatically prioritizing performance data for one or more system configurations have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine implemented method comprising:
   obtaining performance data about the same software as run on a plurality of systems, using a first tool;
   sorting the performance data for each of the systems by a number of contexts, each context divided into a number of sub-contexts;
   automatic prioritizing the performance data for at least one sub-context using a pre-determined criteria;
   obtaining an insight for at least one sub-context based on the prioritized performance data using a second tool; and
   obtaining an advice associated with that insight using the second tool.

2. The method of claim 1 further comprising inputting the pre-determined criteria using a user interface.

3. The method of claim 1 further comprising displaying the insight and the advice on a display.

4. The method of claim 3 wherein the insight is a qualitative description of a monitored activity in a system.

5. The method of claim 4 wherein obtaining performance data using a first tool comprises:
   collecting data on the software run on a system during a sampling period based on performance counters; and
   transferring the data to a file; and wherein
   the performance data includes central processing unit (CPU) event measurements.

6. The method of claim 5 wherein the plurality of systems are different types of CPU.

7. The method of claim 4 wherein obtaining performance data using a first tool comprises:
   collecting data on the software run on a system during a sampling period based on performance counters; and
   transferring the data to a file; and wherein
   one performance counter counts clockticks.

8. The method of claim 4 wherein obtaining performance data using a first tool comprises:
   collecting data on the software run on a system during a sampling period based on performance counters; and
   transferring the data to a file; and wherein
   one performance counter counts retired instructions.

9. The method of claim 1 wherein the software comprises a plurality of programs, and wherein sorting the data by a number of contexts includes sorting data measurements corresponding to a number of processes in each program, the program being the context and the processes being sub-contexts.

10. The method of claim 1 wherein sorting the data by a number of contexts includes sorting data measurements corresponding to a number of modules for each program, the program being the context and the modules being sub-contexts.

11. The method of claim 1 wherein sorting the data by a number of contexts includes sorting data measurements corresponding to a number of bins of each program, each bin containing a number of lines of the program, the program being the context and the bins being sub-contexts.

12. The method of claim 1 wherein the pre-determined criteria comprises running time the performance data being prioritized for running said software on each of the systems, according to the greatest running time.

13. The method of claim 1 wherein the pre-determined criteria comprises the number of clockticks the performance data being prioritized for running said software on each of the systems, according to the greatest number of clockticks.

14. The method of claim 1 wherein the pre-determined criteria comprises the number of retired instructions the performance data being prioritized for running said software on each of the systems, according to the greatest number of retired instructions.

15. A machine-readable storage medium tangibly embodying a sequence of instructions executable by the machine to perform a machine-implemented method, the method comprising:
   obtaining performance data about the same software running on first and second systems using a first tool;
   sorting the performance data for each system by a number of contexts in the software, each context divided into a number of sub-contexts;
   automatic prioritizing the performance data for at least one sub-context using a pre-determined criteria and displaying the prioritized performance data to a user;
   obtaining an insight for at least one sub-context based on the prioritized performance data using a second tool and displaying the insight to the user; and
   obtaining an advice associated with that insight using the second tool.

16. The machine-readable storage medium of claim 15 wherein the pre-determined criteria is the highest number of clockticks.

17. A method comprising:
   obtaining performance data about the same software run on a first system and a second system using a first tool;
   sorting the performance data for both systems by a number of contexts in the software, each context divided into a number of sub-contexts;
   automatic prioritizing the performance data for at least one sub-context using a pre-determined criteria;
   comparing the prioritized performance data for the first system and the second system;
   obtaining an insight for a sub-context of one system by using the comparison between the first and second systems using a second tool; and
   obtaining an advice associated with that insight using the second tool indicating what should be done in response to the insight to improve the performance of the software on the first system, relative to the second system.

18. The method of claim 17 further comprising inputting the pre-determined criteria using a user interface.

19. The method of claim 17 further comprising displaying the prioritized performance data, the insight, and the advice on a display.

20. The method of claim 17 wherein obtaining performance data for a first system and a second system using a tool comprises:
   collecting data on a number of programs that comprise the software run on a system during a sampling period based on performance counters; and
   transferring the data to a file.

21. The method of claim 20 wherein the performance data includes central processing unit (CPU) event measurements.

22. The method of claim 20 wherein the first and second systems are processors.

23. The method of claim 20 wherein one performance counter counts clockticks.

24. The method of claim 20 wherein one performance counter is counts retired instructions.

25. The method of claim 20 wherein sorting the data by a number of contexts includes sorting performance data measurements for a number of processes for each program, the program being the context and the processes being the sub-contexts.

26. The method of claim 20 wherein sorting the data by a number of contexts includes sorting performance data measurements for a number of modules for each program, the program being the context and the modules being the sub-contexts.

27. The method of claim 20 wherein sorting the data by a number of contexts includes sorting performance data measurements for a number of bins for each program, each bin containing a number of instruction of the program, the program being the context and the bins being the sub-contexts.

28. The method of claim 17 wherein the pre-determined criteria comprises $T_1$–$T_2$, where
$T_1$ represents a running time of at least one of a context and a sub-context on the first system, and
$T_2$ represents a running time of at least one of the context and the sub-context on the second system.

29. The method of claim 17 wherein the pre-determined criteria comprises $C_{T1}$–$C_{T2}$, where
$C_{T1}$ represents the clockticks for at least one of a context and a sub-context on the first system, and
$C_{T2}$ represents the clockticks for at least one of the context and the sub-context on the second system.

30. The method of claim 17 wherein the pre-determined criteria comprises $0.8 \times C_{T1}$–$C_{T2}$, where
$C_{T1}$ represents the clockticks for at least one of a context and a sub-context on the first system, and
$C_{T2}$ represents the clockticks for at least one of the context and the sub-context on the second system.

31. A machine-readable storage medium tangibly embodying a sequence of instructions executable by the machine to perform a machine-implemented method, the method comprising:
obtaining performance data about the same software run on a first system and a second system using a first tool;
sorting the performance data for both systems by a number of contexts in the software, each context divided into a number of sub-contexts;
automatic prioritizing the performance data for at least one sub-context using a pre-determined criteria;
comparing the prioritized performance data for the first system and the second system;
obtaining an insight for a sub-context by using the comparison between the first and second systems using a second tool wherein the insight indicates that the sub-context takes longer to run on the first system than the second system; and
obtaining an advice associated with that insight using the second tool.

32. The machine-readable storage medium of claim 31 wherein the pre-determined criteria comprises $T_1$–$T_2$, where
$T_1$ represents a running time of the sub-context on the first system, and
$T_2$ represents a running time of the sub-context on the second system.

33. A system comprising:
a first tool to obtain performance data about the same software running on a plurality of systems;
a sorter to sort the performance data by a number of contexts in the software, each context divided into a number of sub-contexts;
a prioritizer to automatically prioritize the performance data for at least one sub-context using a pre-determined criteria; and
a second tool to obtain an insight for at least one sub-context based on the prioritized performance data and an advice associated with that insight.

34. The system of claim 33 wherein the second tool comprises:
an insight module to determine the insight for the sub-context based on the prioritized performance data; and
an advice module to determine the advice associated with that insight.

35. The system of claim 33 further comprising a comparator to compare a first system and a second system by comparing prioritized performance data of both systems.

36. The system of claim 33 further comprising a user interface to allow a user to input the pre-determined criteria.

37. The system of claim 33 further comprising a display to display at least one of the prioritized performance data, the insight, and the advice.

38. The system of claim 33 wherein the systems are different types of processors.

39. The system of claim 33 wherein the sorted performance data includes performance data for a number of processes in each program, the program being the context and the processes being the sub-contexts.

40. The system of claim 33 wherein the sorted performance data includes performance data for a number of modules in each program, the program being the context and the processes being the sub-contexts.

41. The system of claim 33 wherein the sorted performance data includes performance data for a number of bins in each program, each bin containing a number of lines of programming instructions, the program being the context and the bins being the sub-contexts.

42. The system of claim 33 wherein the pre-determined criteria comprises running time.

43. The system of claim 33 wherein the pre-determined criteria comprises number of clockticks.

44. The system of claim 33 wherein the pre-determined comprises number of retired instructions.

45. The system of claim 35 wherein the pre-determined criteria is comprises $T_1$–$T_2$, where
$T_1$ represents a running time of at least one of a contexts and a sub-context on the first system, and
$T_2$ represents a running time of at least one of the context and the sub-context on the second system.

46. The system of claim 35 wherein the pre-determined criteria is comprises $C_{T1}$–$C_{T2}$, where
$C_{T1}$ represents the clockticks for at least one of a context and a sub-context on the first system, and
$C_{T2}$ represents the clockticks for at least one of the context and the sub-context on the second system.

47. The system of claim 35 wherein the pre-determined criteria is comprises $0.8 \times C_{T1}$–$C_{T2}$, where
$C_{T1}$ represents the clockticks for at least one of a context and a sub-context on the first system, and
$C_{T2}$ represents the clockticks for at least one of the context and the sub-context on the second system.

* * * * *

UNITED STATES PATENT AND TRADEMARK OFFICE
CERTIFICATE OF CORRECTION

PATENT NO. : 7,043,719 B2
APPLICATION NO. : 09/912173
DATED : May 9, 2006
INVENTOR(S) : Gotwals et al.

It is certified that error appears in the above-identified patent and that said Letters Patent is hereby corrected as shown below:

In column 1, at line 36, insert --.-- after "system".
In column 2, at line 24, insert --.-- after "system".
In column 5, at line 5, delete "frequent" and insert --Frequent--.
In column 5, at line 49, insert --.-- after "system".
In column 7, at line 33, delete "CPU" and insert --CPUs--.
In column 8, at line 65, delete "is".
In column 10, at line 53, delete "is".
In column 10, at line 60, delete "is".

Signed and Sealed this

Sixth Day of November, 2007

JON W. DUDAS
*Director of the United States Patent and Trademark Office*